May 8, 1923.

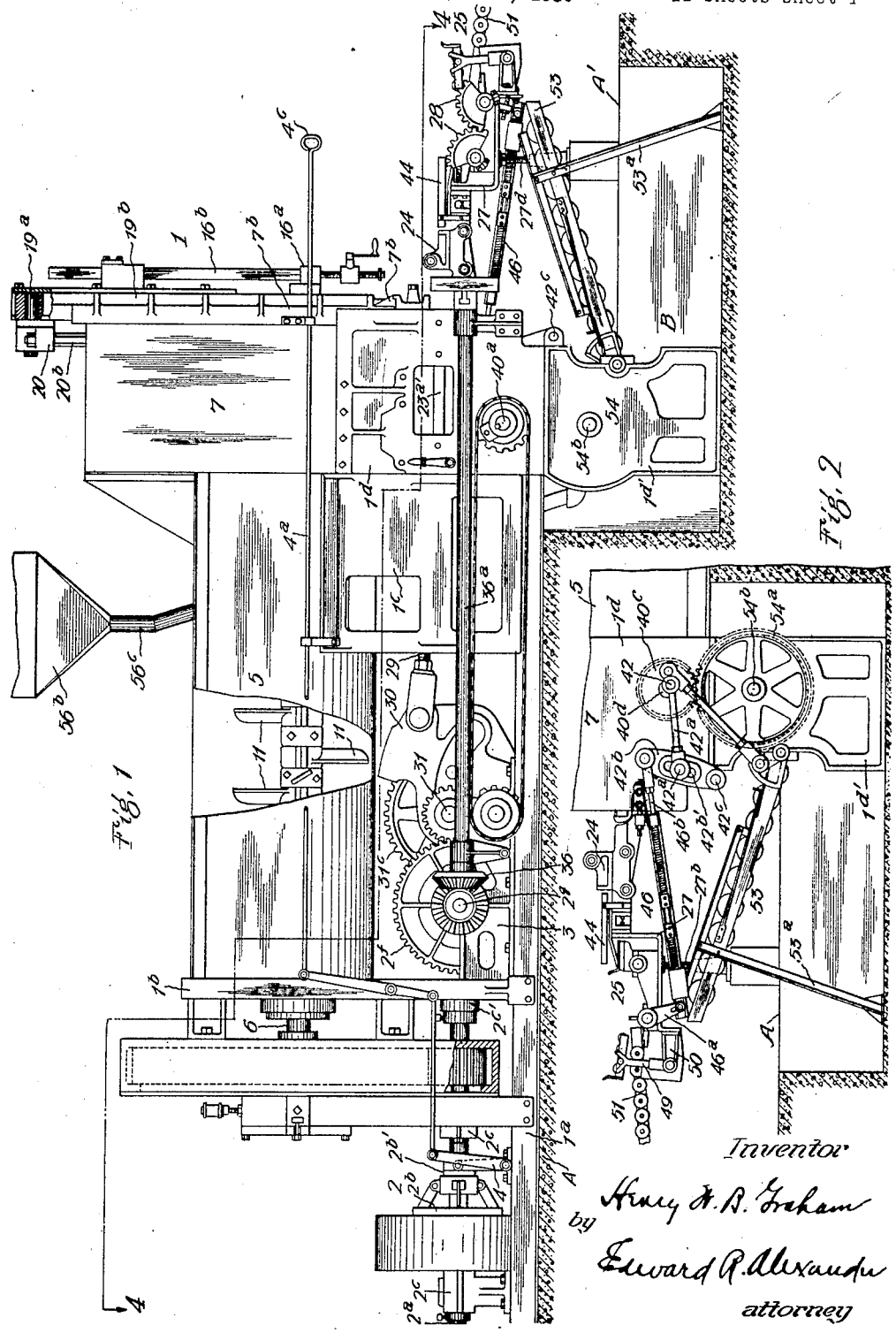

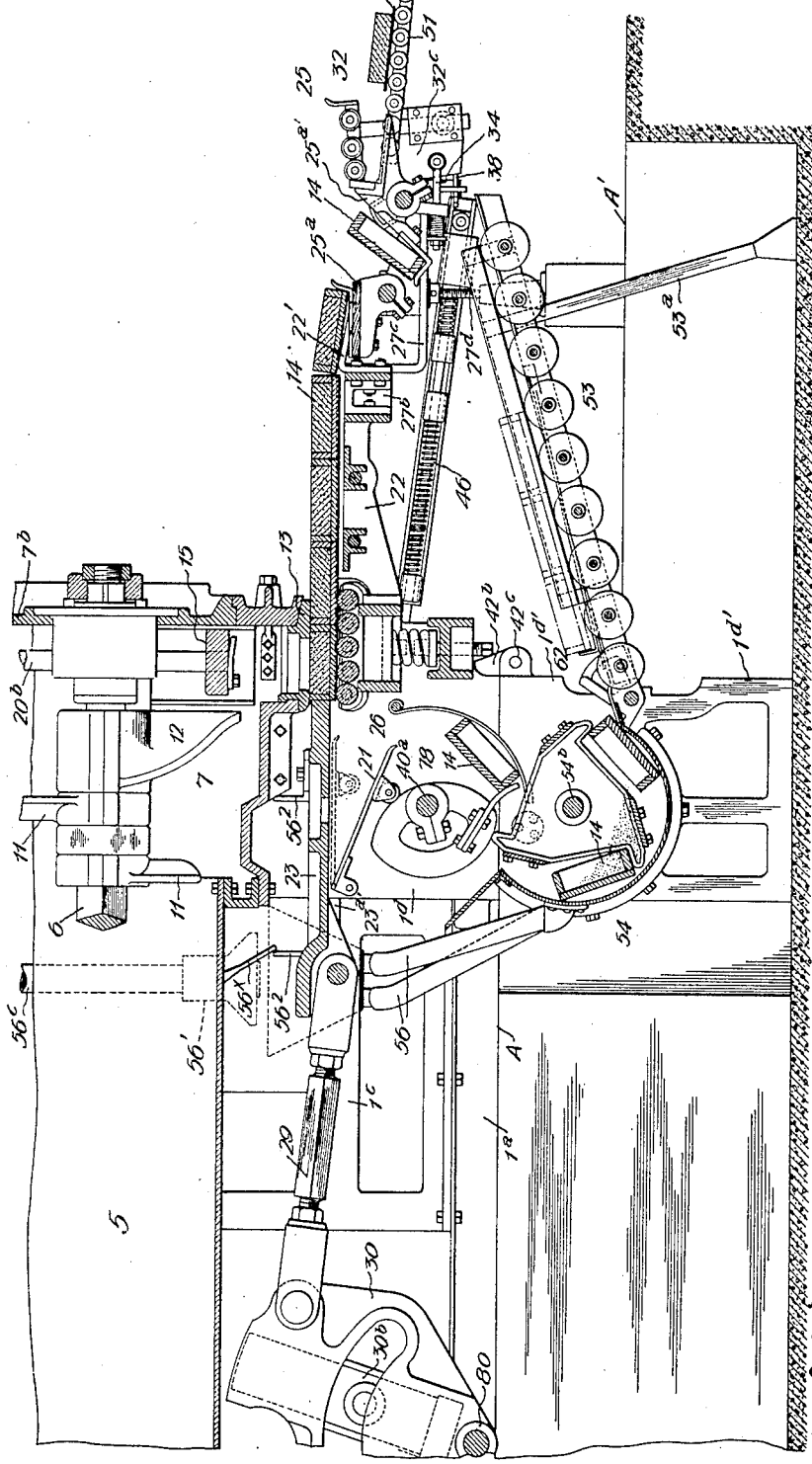

H. W. B. GRAHAM

BRICK MACHINE

Filed Feb. 15, 1919

Inventor
Harry W. B. Graham
by
Edward R. Alexander
attorney

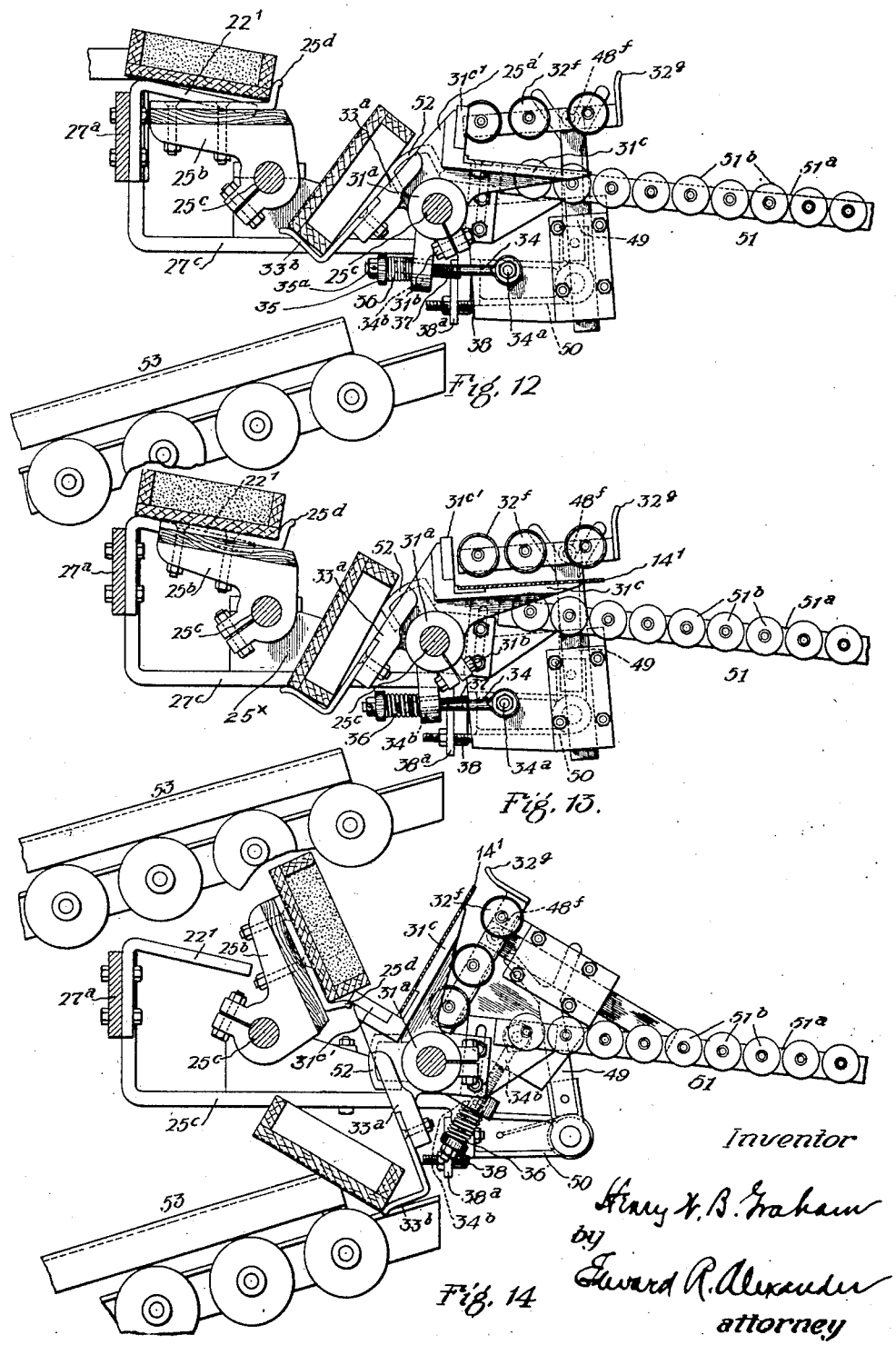

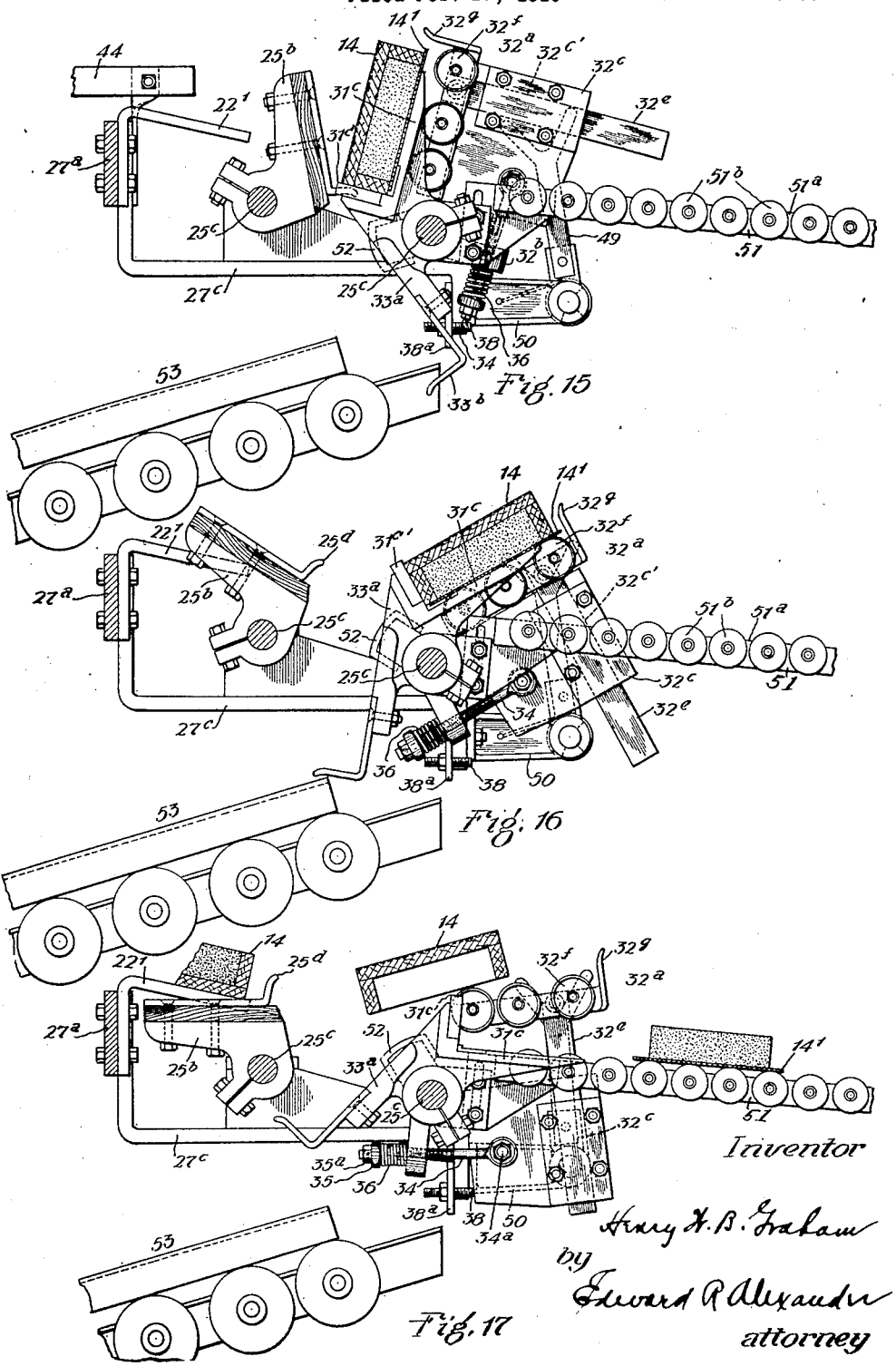

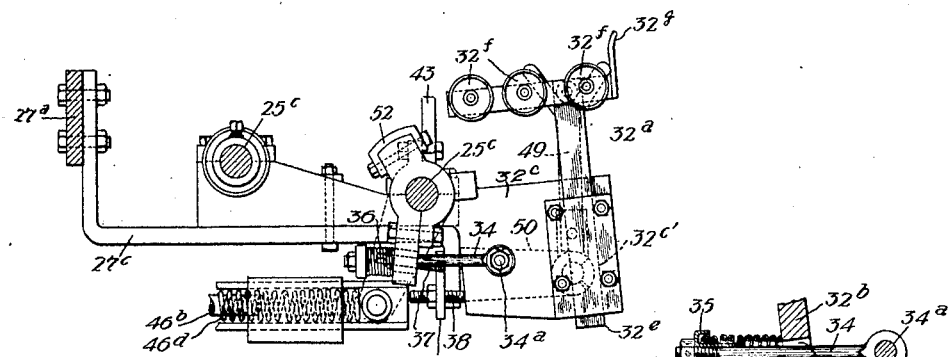
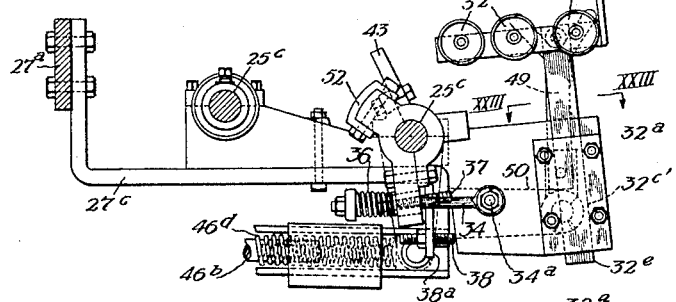
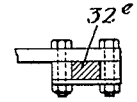
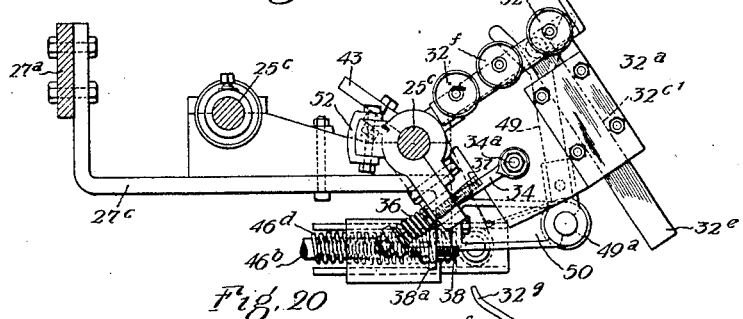
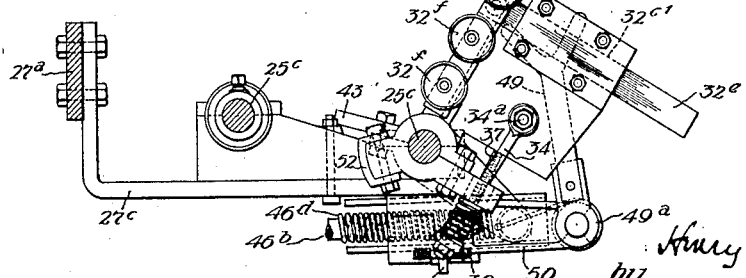

May 8, 1923.
H. W. B. GRAHAM
BRICK MACHINE
Filed Feb. 15, 1919
1,454,165
11 Sheets-Sheet 9
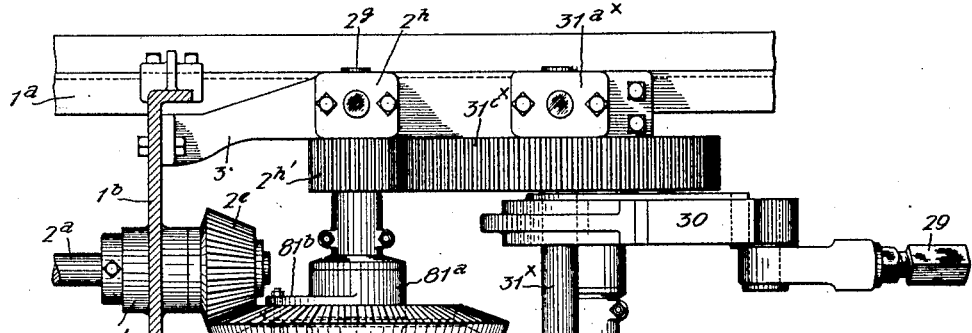
Fig. 24
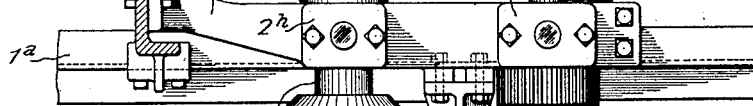
Fig. 25
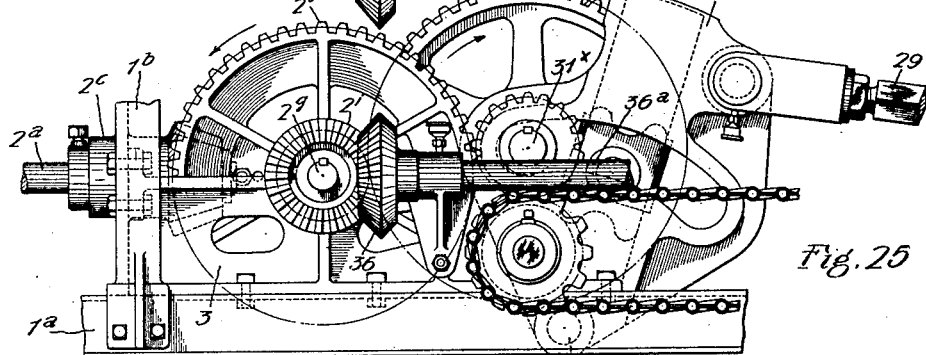
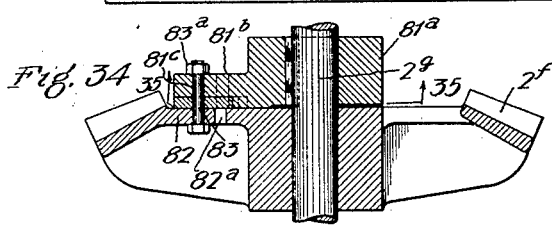
Fig. 34
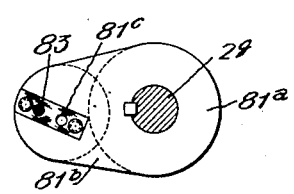
Fig. 35
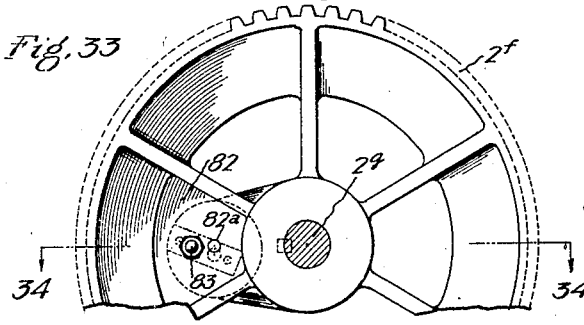
Fig. 33
Inventor
Henry W. B. Graham
by Edward R. Alexander
attorney May 8, 1923.

H. W. B. GRAHAM

BRICK MACHINE

Filed Feb. 15, 1919

Inventor
Henry W. B. Graham
by
Edward R. Alexander
attorney

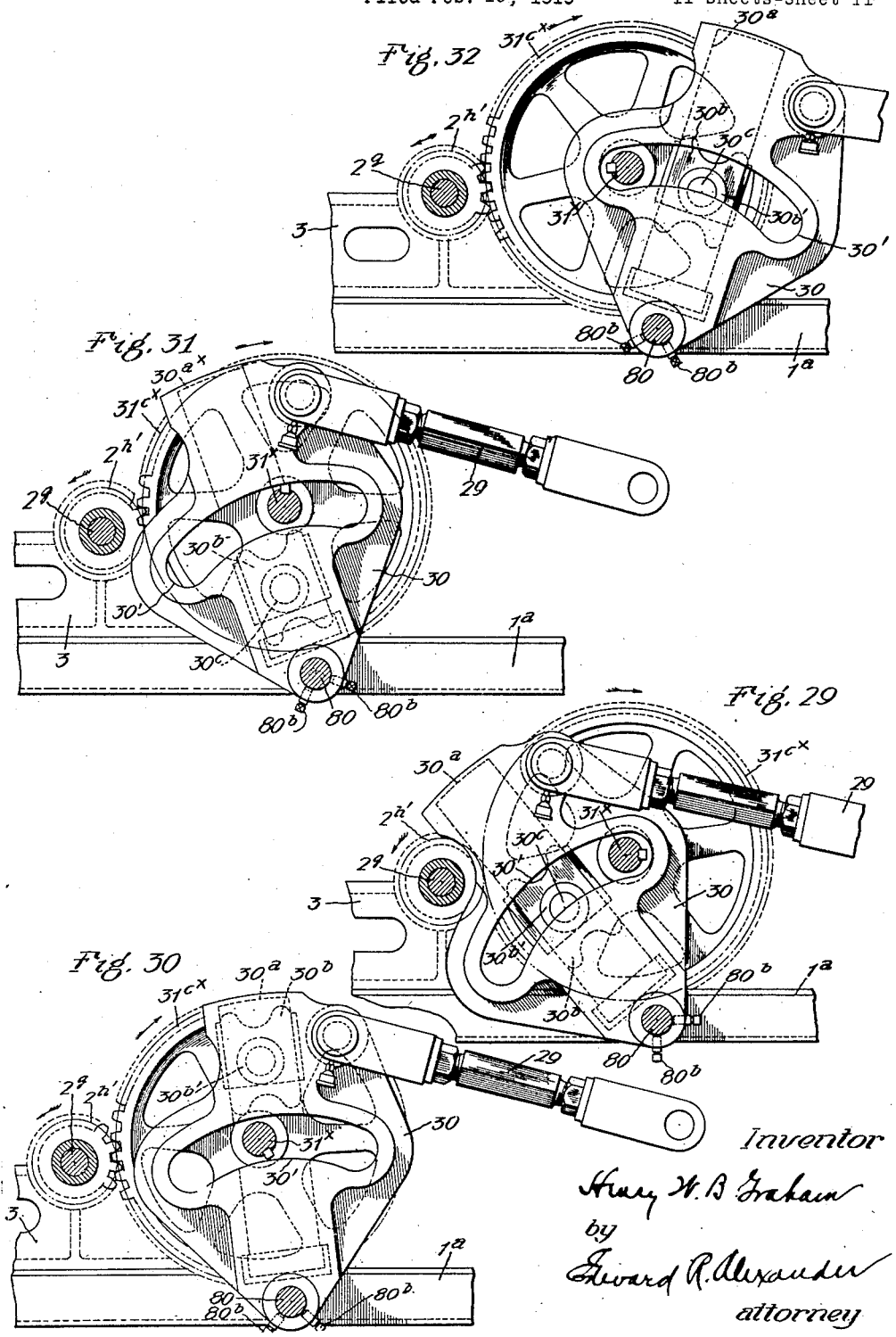

Patented May 8, 1923.

1,454,165

UNITED STATES PATENT OFFICE.

HENRY W. B. GRAHAM, OF NEW LONDON, OHIO, ASSIGNOR TO THE ARNOLD-CREAGER COMPANY, OF NEW LONDON, OHIO, A CORPORATION OF OHIO.

BRICK MACHINE.

Application filed February 15, 1919. Serial No. 277,286.

*To all whom it may concern:*

Be it known that I, HENRY W. B. GRAHAM, a citizen of the United States, residing at New London, in the county of Huron and State of Ohio, have invented certain new and useful Improvements in and Relating to Brick Machines, of which the following is a specification.

My invention relates to brick making apparatus. It may be and preferably is embodied in that type of apparatus wherein a plurality of molds are successively filled and emptied.

The invention particularly relates to and comprises improvements upon or in apparatus of the character disclosed in my co-pending application Ser. No. 81,425.

One object of the invention is to simplify and improve the mechanism disclosed in my aforesaid application for separating the molds and bricks, for discharging and for handling the empty molds, whereby the construction is materially cheapened, the molds positively guided and manipulated, the distance of travel of the molds shortened, undue strains on the molds and machine minimized and the output of the machine materially increased.

Another object of the invention is to provide novel mechanism adapted to invert filled molds, separate the molds from the bricks and to quickly discharge the empty molds.

A further object of the invention is to provide novel mechanism adapted to invert filled molds, separate the molds from the bricks and to turn the empty molds right side up.

Another object of the invention is to provide improved mechanism which inverts and substantially simultaneously separates the molds and bricks and then discharges and also positions the empty molds right side up for delivery to the sanding mechanism or return to their feeding position.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

Referring to the drawings:

Fig. 1 is a side elevation of a brick machine embodying my invention.

Fig. 2 is a fragmentary view looking at the opposite side of the machine.

Fig. 3 is a fragmentary longitudinal sectional view of the machine showing the position of the molds as they are filled, emptied, discharged and returned to the filling station.

Fig. 7 is a section on the line 7—7 of Fig. 5.

Fig. 8 is a fragmentary view on the line 8—8 of Fig. 5 looking in the direction of the arrows.

Fig. 8$^a$ is a section on the line 8$^a$—8$^a$ of Fig. 8.

Fig. 9 is a detail view of one of the arresters.

Fig. 9$^a$ is a fragmentary view on the line 9$^a$—9$^a$ of Fig. 9, looking in the direction of the arrows.

Fig. 10 is a section on the line 10—10 of Fig. 9.

Fig. 11 is a detail view.

Figure 5:
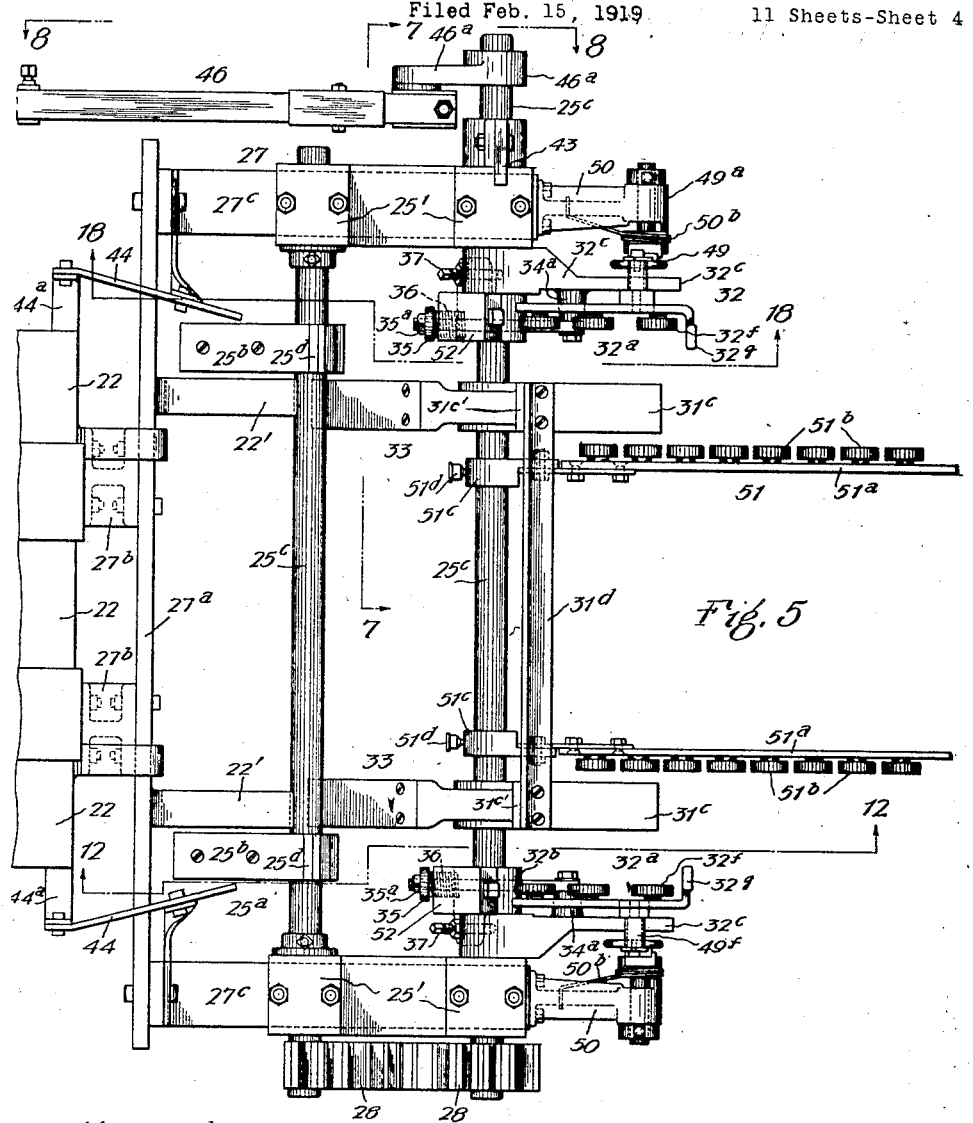
Fig. 5 is a fragmentary top plan view, somewhat enlarged, showing the mold inverting, separating and discharging mechanism.

Figs. 12 to 17, inclusive, are sectional views on the line 12—12 of Fig. 5, illustrating the manipulation of the mold to invert it, separate the molds and bricks, right the empty mold and discharge it upon the return conveyor.

Figs. 18 to 21, inclusive, are sectional views on the line 18—18 of Fig. 5, corresponding to Figs. 17, 18, 19 and 20, respectively, certain of the mold carrying or operating elements being omitted.

Figs. 22 and 23 are detail sectional views.

Fig. 24 is a fragmentary view, enlarged, on the line 4—4 of Fig. 1.

Fig. 25 is a side elevation of the elements shown in Fig. 24.

Figure 26:
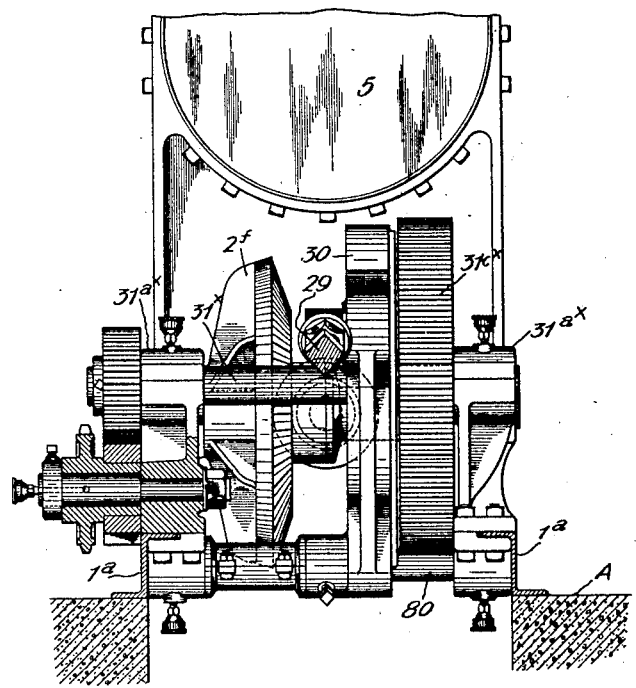

Fig. 26 is an elevation of the elements shown in Figs. 24 and 25, looking toward the left.

Figure 27:
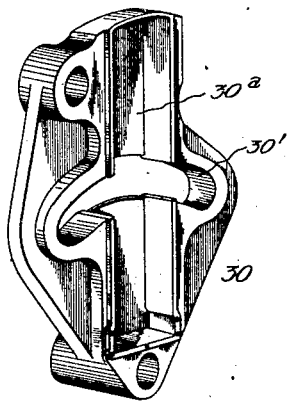
Figure 28:
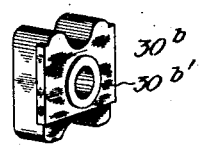

Figs. 27 and 28 are detail views.

Figs. 29, 30, 31 and 32 are fragmentary views illustrating the operation of the reciprocating mechanism for the mold push out.

Figs. 33, 34 and 35 are detail views.

In the drawings, 1 indicates as an entirety a brick machine, preferably supported on a pair of spaced sills 1ª. The sills 1ª may rest upon the floor, indicated at A. The front end of the machine extends over a pit B, which accommodates certain mechanisms, as will be later set forth. The machine illustrated preferably comprises a horizontal pug mill 5 and a charging chamber 7. 2 indicates as an entirety a drive mechanism adapted to operate a pug mill shaft 6 and a shaft 2ˢ. The driving mechanism is connected and disconnected by means of a clutch 2ᵇ, which is operated by operating devices indicated at 4. The shaft 2ˢ is supported at or near its opposite ends in bearings 2ʰ. The shaft 2ˢ is provided with a gear 2ʰ' the purpose of which will be later set forth. The shaft 6 preferably extends through the pug mill and has bearing at its front end in the front plate or wall 7ᵇ of the charging chamber 7. The pug-mill shaft 6 is provided with pug-knives 11 adapted to pug and feed the material forward to the charging chamber 7 in a well known manner. 15 indicates a press platen preferably mounted to reciprocate vertically in the charging chamber 7. 13 indicates a die through which the brick material is forced by the press platen 15 into suitable molds, indicated at 14. The molds 14 may be and by preference are constructed similar to the molds described and claimed in my co-pending application Ser. No. 127,981. 12 indicates a wiper carried by the pug-mill shaft 6 and operating to move the material below or into the path of movement of the press platen 15 in co-operation with its movement vertically. 20ᵇ indicates a plurality of rods that connect the press platen 15 with a cross head 20. The cross head 20 is connected to and operated by a plunger 19ª, slidably mounted in guides 19ᵇ on the front plate 7ᵇ. 16ᵇ indicates a pitman pivotally connected at its upper end with the plunger 19ª. At its lower end the pitman is preferably connected to a crank 16ª on the front end of the pug shaft 6 in any well known manner, such for instance as shown in my aforesaid application Ser. No. 81,425. This arrangement is a relatively simple one and insures co-operation of the press platen 15 with the wiper 12.

21 indicates a receiver arranged rearward of the filling station and adapted successively to receive and support the empty molds 14 for delivery to the position for filling. The receiver 21 is pivotally connected at its rear end to the frame side plates 1ᵈ, whereby it may swing from its normal horizontal position (see dotted lines in Fig. 3) downwardly to form a delivery gap 26 at the time an empty mold 14 is being delivered to or upon it. The mechanism for operating and controlling the receiver and for elevating or moving the molds 14 upwardly thereonto is indicated as an entirety at 78. As no claim is made herein to this mechanism and as such mechanism forms the subject-matter of my co-pending application Ser. No. 252,681, reference is made thereto for a more detailed description of this mechanism.

22 indicates a support over which the molds 14 are moved. The support 22 is arranged below the die 13 and extends forwardly from the charging chamber 7 to support the molds 14 as they are moved from the filling position or station to a position for bumping by a bumping mechanism, indicated as an entirety at 24, and to an inverting, separating and discharging mechanism, indicated as an entirety at 25. For a detail description of the bumping mechanism, reference is made to my aforesaid application and also to my co-pending application Ser. No. 228,640½, which is a division thereof.

23 indicates a mold push out which operates to push each mold 14 forwardly from the receiver 21 to the filling station on the support 22 and through the succeeding molds to move the previously moved mold or molds along the support 22, as just described, step by step. The push out 23 is slidably supported in suitable guides 23ª' carried by the inner walls of the frame plates 1ᶜ, whereby it may be reciprocated, preferably by a pitman 29. The pitman 29 may be pivotally connected at 29ª to and operated by a rocker 30, which may in turn be operated by the driving mechanism 2, as will be later set forth. The pitman 29 may be operated by any other suitable means, such for instance, that shown in my aforesaid application.

For a more detailed description of the elements already referred to, except the inverting, separating and discharging mechanism 25, the elevating and controlling means 78 for the receiver and molds, the rocker 30 and its operating mechanism, reference is made to my aforesaid application Ser. No. 81,425.

Figure 4:
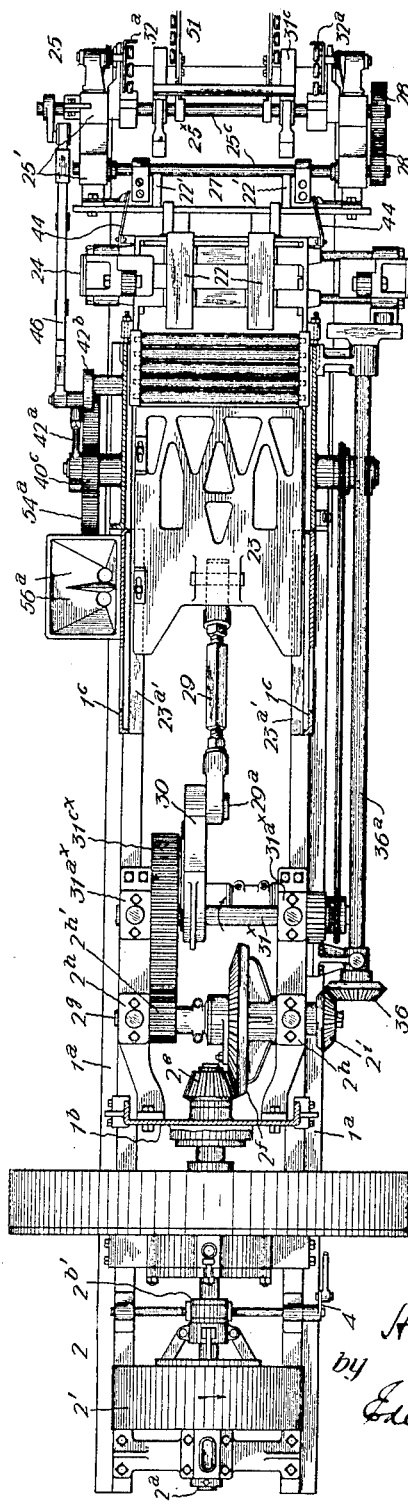
Fig. 4 is a horizontal sectional view on the line 4—4 of Fig. 1.

54 indicates a sanding mechanism arranged in the pit B below the receiver 21 and filling station and preferably rearward of the latter. This mechanism is adapted to sand the molds and to deliver them to the mold elevating mechanism 78, one by one and in co-operation therewith. 56 indicates a plurality of feed pipes for supplying sand to the sand chamber of the sanding mechanism 54. The upper end of each pipe 56 is connected to hoppers 56ª (Fig. 4). The hoppers 56ª are preferably uniformly and substantially continuously supplied with sand by a feed mechanism, indicated as an entirety at 56'. The feed mechanism 56' preferably includes operating devices, comprising a swingable arm 56ˣ and a pair of spaced tappets 56ᶻ fixed to the push out 23. The sand feed mechanism and the operating devices thereof form the subject-matter of my copending application Ser. No. 252,682, to which reference is made for a further and more detail description. 56ᵇ indicates a sand supply bin, which may be supported in any desired manner and connected by a chute 56ᶜ to the feed mechanism 56', whereby sand is supplied to the latter.

53 indicates as an entirety a chute or conveyor extending downwardly into the pit B and in a direction longitudinally of the apparatus 1. The receiving end of the chute 53 is arranged below and in juxtaposition to the inverting, separating and mold discharging mechanism 25, so as to receive the empty molds as they are discharged therefrom. The other end of the chute 53 is preferably so supported that it delivers the empty molds direct to the sanding mechanism 54. 62 indicates as an entirety a control and release mechanism arranged at the delivery end of the chute 53 for regulating the delivery of the molds to the sanding mechanism 54. The conveyor 53 and the mold control or release mechanism 62 associated therewith may be and preferably are constructed similarly to corresponding elements disclosed in my aforesaid application Ser. No. 81,425, to which reference is made for a detail description of these elements. In the present construction, the chute or conveyor may be supported at its front end on legs 53ª and such end may be elevated to bring it into proper position to receive the empty molds discharged from the inverting, separating and discharging mechanism 25, as will later be described. This arrangement serves to incline the conveyor at a greater angle, as compared to that disclosed in my aforesaid application, so that the empty molds move from the inverting, separating and discharging mechanism 25 to the sanding mechanism 54 relatively fast. As a result of this arrangement, the entire machine may be run at a relatively high rate of speed.

By providing the inverting and separating mechanism with an element or elements which discharge the empty molds direct to the conveyor 53 and also reinvert or right them for delivery to the sanding mechanism right side up, I am enabled to simplify the construction of the machine, materially increase its speed, overcome disadvantages incident to sticking and disalignment of the molds due to clogging of the mold guides by surplus clay, and to operate the machine at full capacity with a smaller number of molds as compared to that required in the apparatus disclosed in my aforesaid application Ser. No. 81,425.

Of the inverting, separating and mold discharging mechanism 25, 25ª, 25ª', indicate a pair of co-operating members. The members 25ª, 25ª', are preferably swingably mounted and when so arranged, they swing from an open position (see Figs. 1, 3, 5, 6 and 12) to a closed position (see Fig. 15) or toward each other substantially simultaneously and back again. When in the open position, the swingable member 25ª is positioned to receive a filled mold (Fig. 12) from the support 22, inclined guides 22' being preferably provided to bridge the space from the support to the swingable member; while the member 25ª' is positioned to permit the discharge of the bricks to a conveyor 51. The members 25ª, 25ª', are so constructed and correlated that when they are operated as just described, they serve to invert each filled mold, separate the mold from the bricks, discharge the empty mold and turn it right side up and position it upon the chute or conveyor 53, along which it then moves or slides for return to the receiver 21. Furthermore, the members 25ª, 25ª', are spaced or separated from or relative to each other to form between them, when they are opened, a gap or opening 25ˣ through which the empty molds move for discharge or delivery to the chute 53. Each of the members 25ª, 25ª', is preferably connected to and operated by a rock shaft 25ᶜ. The shafts 25ᶜ are loosely mounted in suitable bearings 25', preferably carried by a support 27. The support 27 may comprise a transverse bar 27ª connected to the front end of the support 22 by blocks 27ᵇ, and forwardly extending arms 27ᶜ. The arms 27ᶜ may also be braced and steadied by a pair of adjustable legs 27ᵈ (Fig. 1), which may rest on a sub-floor A'. At one side of the apparatus, the shafts 25ᶜ are extended and carry gears 28, which mesh with each other to insure simultaneous movement of the shafts, when one of them is operated, as may be done by mechanism indicated as an entirety at 46. The gears 28 are preferably of the segmental type.

The member 25ª preferably comprises a pair of spaced arms 25ᵇ, having at their inner ends abutments 25ᵈ with which the mold engages and on which it rests as the arms 25ᵇ move upwardly. Each arm 25ᵇ is provided with a split hub that is preferably clamped to the adjacent shaft 25ᶜ by a bolt (Figs. 12, 13 and 14). The member 25ª' preferably comprises three elements, to-wit: (1) an element 31 adapted to receive and support a pallet 14' (Fig. 13) which in turn receives and supports the bricks dumped from the mold as the latter is inverted (Fig. 16); (2) a separator element 32 which engages the end walls or members of the mold 14 to cause separation of the mold from the bricks, and which finally discharges the empty mold, and (3) an element 33 which receives the empty mold from the separator element 32 (Figs. 12 and 13) and rights the mold and then positions it on the chute 53 (Fig. 14). The element 33 is, by preference, connected to the element 31 and moves therewith, but is so arranged relative to the element 31 about the axis of the adjacent shaft $25^{a\prime}$, that it occupies a position between the members $25^a$, $25^{a\prime}$, and below the gap or opening $25^x$ between them, when said members are operated to the open position. All of the elements just referred to (except certain parts of the separator element about to be described) are fixedly connected to the adjacent rock shaft $25^c$ for bodily movement therewith. The pallet and brick receiving element 31 preferably comprises a pair of castings having hubs $31^a$ which may be split and clamped in any desired way—as by bolts $31^b$—to the shaft $25^c$, and arms $31^c$. The arms $31^c$ may be connected together by an angle iron $31^d$, the upstanding leg of which serves to support the pallet $14^\prime$ against movement inwardly or downwardly as the arms $31^c$ move upwardly and downwardly. Each arm may be provided with a foot $31^{c\prime}$ on which the mold rocks as it swings past the vertical from the member $25^a$ to the member $25^{a\prime}$ (see Figs. 14 and 15). By preference the element 33 may comprise a pair of arms $33^a$, each of which is connected to one of the arms $31^c$, as shown in Fig. 11. By this arrangement, the arms $33^a$ swing downwardly and rearwardly, as the arms $31^c$ swing upwardly, and carry the empty mold with them until it is slightly re-inverted or turned right side up, after which and while the arms are still moving rearwardly, the upper side of the mold will gravitate downwardly so that the mold finally is completely righted and then positioned or discharged on the chute 53. Each arm is provided with a foot piece $33^b$ on which the mold 14 rests and pivots as the element 33 swings downwardly and rearwardly to its rearmost position (see Figs. 14 and 15). The separator element 32 preferably comprises a pair of devices $32^a$ arranged on the adjacent shaft $25^c$ outside of the arms $31^c$, so as to engage the mold beyond the opposite ends of the pallet $14^\prime$. Each device $32^a$ is provided with a mold engaging member, indicated at $32^d$, which is arrested in the opening movement of the elements 31 and 32, to cause separation of the mold from the bricks as the element 31 moves to its extreme open position. The mold engaging members $32^d$ and their operation will be later referred to.

To permit and insure ready and quick delivery of the empty mold from the separating devices $32^a$ to the receiving and discharge element 33, each of these separating devices is preferably formed of two members $32^b$, $32^c$, one of which ($32^c$) is movable relative to the other ($32^b$), whereby it and the adjacent mold engaging member $32^d$, which engages and supports each mold, may be stopped at a predetermined inclined position to effect delivery of the mold to the discharge element 33. For this purpose each member $32^b$ is fixed to and moves with the adjacent shaft $25^c$ and the adjacent member $32^c$ is preferably loosely mounted on the adjacent shaft $25^c$, whereby it may be arrested or stopped at a predetermined position during movement of the fixed member $32^b$. The mold engaging members $32^d$ are movably mounted on the elements $32^c$ and move relative thereto in the manner hereinafter described as the swingable member $25^{a\prime}$ swings to the open position to separate the mold from the bricks (see Fig. 16). At or near its outer end each element $32^c$ is formed with a socket or guide walls $32^{c\prime}$, in which is slidably supported a rod or leg $32^e$ depending from the adjacent member $32^d$. The rod $32^e$ is of proper shape in cross section to properly fit and move endwise in the socket $32^{c\prime}$. The mold engaging members are preferably provided with rollers $32^f$ which permit the molds 14 to readily slide off thereof, and stops $32^g$ which prevent the molds from falling or rolling off the members $32^d$ in an outward direction as they swing to the open position.

Figure 6:
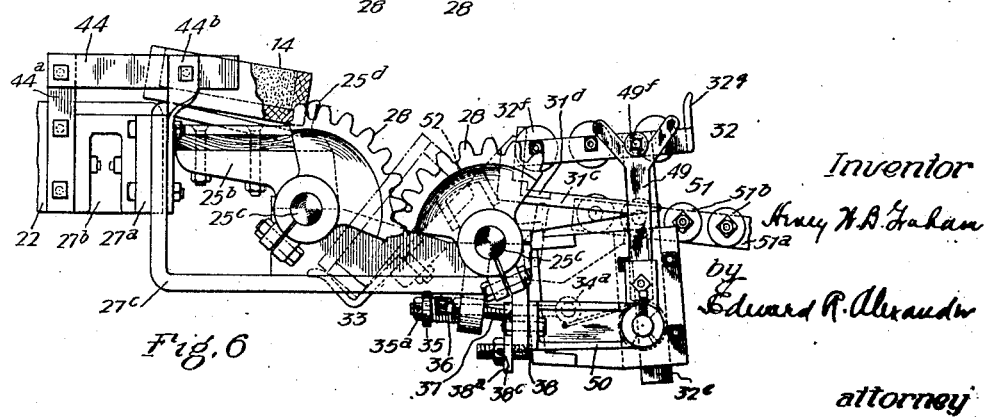
Fig. 6 is a side view of the parts shown in Fig. 5.

Each member $32^c$ is preferably held in fixed relationship with the adjacent member $32^b$ during a portion of its movement by the following instrumentalities: 34 indicates a rod pivotally connected at its outer end in any well known manner upon a stud $34^a$ projecting from the member $32^c$ (see Figs. 5 and 18). The rod 34 extends through an opening $34^b$ formed in the member $32^b$ (see Figs. 12, 13 and 22). The inner end of the rod is provided with screw threads and carries a collar 35 and adjusting nut $35^a$. 36 indicates a compression spring interposed between the collar 35 and member $32^b$. In assembling these elements the nut is adjusted to place the spring 36 under sufficient compression, so that it may act on the collar and, through it and the rod 36, function to hold the adjacent member $32^c$ yieldingly against the member $32^b$, or by preference, an adjustable stop 37 carried thereby, whereby they may swing together as a unit during the operation of the swingable members $25^a$, $25^{a\prime}$, until the loosely mounted member $32^c$ engages a stop 38, which engagement takes place during the latter part of the movement of the member $25^{a\prime}$ in the opening direction and after the mold and bricks have been separated from each other (Fig. 17). As the member $25^{a\prime}$ swings to the full open position, the members $32^c$ will engage the fixed stops 38 and be held against further swinging movement with the member 32ᵇ, but the members 32ᵇ will continue to move to their extreme open position thus placing the spring 36 under compression (see Figs. 17 and 18). The stops 38 are so arranged that at the time the members 32ᶜ are engaged and arrested thereby, the latter will be in a predetermined inclined position, thus insuring that the empty mold on the mold engaging members 32ᵈ will, under the influence of gravity, quickly roll or slide off rearwardly on to the discharge member 33. However, it may be explained at this point that engagement of the members 32ᶜ with the stops 38 does not take place until the bricks are separated from the empty mold 14, as it is essential during the travel of the devices 32 toward the opening position, while dumping and separation of the bricks is taking place, that the pallet be maintained parallel with the mold and that their relative movement be perpendicular. Due to the fact that the operating connections 46 are constructed and arranged to move the element 31 to a downwardly inclined position (see Fig. 17), the pallet 14′ and bricks thereon may be discharged upon or caused to engage a suitable conveyor 51, preferably of the gravity type, whereby they will readily move away from the apparatus. My construction lends itself admirably to the accomplishing of these results. Each stop 38 may comprise a screw adjustably mounted in an opening formed in a bracket 38ᵃ, which is fixed to and depends from the adjacent arm 27ᶜ. As shown in Figs. 6, 9 and 12, the free end of each arm 27ᶜ is bent downwardly and the bracket 38ᵃ is secured to said end by bolts 38ᵇ. Each stop 38 may be maintained in its adjusted position by a nut 38ᶜ, or other locking means.

49, 49, indicate a pair of arresters which engage the mold engaging members 32ᵈ as the latter swing to the open position with the devices 32ᵇ, 32ᶜ, and arms 31ᵃ. Each arrester is preferably pivoted at its lower end in bearings 49ᵃ provided on a suitable bracket 50. The bracket 50 may be secured in any desired manner, preferably by the bolts 38ᵇ, to the depending end of the adjacent supporting arm 27ᶜ (Figs. 9 and 10). The arrester 49 is pivoted to swing forwardly and rearwardly (see dotted lines in Fig. 9), to accommodate itself to the positions of the mold engaging members 32ᵈ as the member 25ᵃ′ swings in either direction. 50ᵃ indicates a stop or abutment provided on the wall of the bearing 49ᵃ. This stop is arranged in the path of movement of a lug 50ᵃ′ provided on the hub of the arrester and serves to limit the movement thereof in one direction. The stop 50ᵃ is preferably arranged to support the arrester in normal position or that position wherein it may engage the adjacent mold engaging member 32ᵈ (or preferably a pin or roller 49ᶠ projecting therefrom) as the latter swings toward the open position. I preferably provide between each bracket 50 and arrester a spring 50ᵇ, which serves to yieldingly maintain the arrester in normal position. The spring 50ᵇ is preferably coiled around the hub of the arrester 49, one of its arms being connected to the bracket 50 and its other arm being formed with a loop that surrounds a bolt 50ᶜ on the arrester (see Fig. 9).

Each arrester preferably comprises a hub member 49′ and a leg 49ˣ adjustably secured together by a bolt 49ᶻ. The upper end of the leg 49ˣ is preferably bifurcated, whereby it may readily be engaged by the pin or roller 48ᶠ. By adjusting the leg 49ˣ relative to the hub member 49′, the upper end of the arrester can be properly positioned.

52 indicates shoes which operate to support and guide each mold as it moves from the separating members 32ᵈ to the discharge member 33. The shoes 52 are preferably supported by the members 32ᵇ; this arrangement brings the shoes in line with the ends or end walls of the molds 14. The shoes serve to elevate the rear edge of the mold as it moves on to the arms 33ᵃ, as shown in Fig. 12. By this arrangement the mold has sliding contact with the arms 33 at its front edge only, hence all danger of the mold sticking to the arms 33ᵃ due to any wet clay thereon is eliminated.

The conveyor 51 operates to convey away the dumped bricks and the pallets, on which they rest, from the inverting, separating and discharge mechanism 25. The conveyor 51 may comprise a pair of bars 51ᵃ on which are loosely mounted rollers 51ᵇ. The inner free ends of the bars 51ᵃ are preferably connected to a pair of collars 51ᶜ, loosely mounted on the adjacent shaft 25ᶜ. The collars 51ᶜ are preferably provided with grease cups 51ᵈ. The collars 51ᶜ serve as a connection between the conveyor and shaft 25ᶜ, whereby the latter may support the adjacent end of the conveyor and maintain it in proper correlationship to the arms 31ᶜ. The inner end of the conveyor 51 extends to a position between the arms 31ᶜ and is preferably disposed in plane substantially parallel to but slightly above that in which the arms are positioned when at the end of their movement to the open position (see Figs. 3, 6 and 17). By this arrangement, the conveyor intercepts each pallet and the bricks thereon as the member 25ᵃ′ swings to the open position and permits the pallet and bricks to gravitate away from the arms 31ᶜ (see Figs. 3 and 17) and move to a place of storage or treatment. The operating connections for the members 25ᵃ, 25ᵃ′, which will presently be described, are so constructed and timed that the pallet and bricks thereon will have moved out of the paths of movement of the arms 31ᶜ, before the latter reach the plane of the conveyor in their return upward movement.

46 indicates as an entirety the mechanism for operating the shafts 25ᶜ. As the shafts 25ᶜ are geared together at one end by the gears 28, as already described, the mechanism is connected through a crank arm 46ᵃ with but one of said shafts. The hub 46ᵃ′ of the arm 46ᵃ may be fixed to the extended end of the adjacent shaft 25ᶜ by a set screw 46ᵃˣ. The mechanism 46 is operatively connected by a crank or crank pin with one of the operating shafts of the apparatus. By preference the mechanism is connected to a rocker 42ᵇ pivoted at 42ᶜ upon the adjacent frame member 1ᵈ′; which rocker may in turn be connected by the elements about to be referred to with a crank pin 42 fixed to a pinion 40ᶜ on the extended end of the shaft 40ᵃ. The pinion 40ᶜ meshes with a gear 54ᶜ which is connected to the shaft 54ᵇ of the sanding mechanism 54. 42ᵃ indicates a rod or pitman connected at one end to the crank pin 42. The opposite end of the rod 42ᵃ is pivotally connected on a pin 42ᵃ′ which may be adjustably connected to the rocker 42ᵇ in any desired manner; for instance, the pin 42ᵃ′ may extend through a slot 42ᵇ′ formed in the rocker and be adjustably secured or clamped to the walls of the slot in any desired manner.

The elements of the mechanism 46 preferably include relatively movable members connected by suitable springs, as will be later set forth. The purposes of this construction is to provide suitable rest periods between successive operations of the swingable members 25ᵃ, 25ᵃ′, during each of which periods a filled mold 14 is delivered to the receiving member 25ᵃ and an empty mold and a pallet with bricks thereon are permitted to move off of the members 32ᵈ, 31, respectively, as well as to reduce strains and stresses on the elements of the operating connections and inverting and separating mechanism 25. Furthermore, the rate of movement or speed of the members 25ᵃ, 25ᵃ′, in their movement toward each other, may be maintained up to any predetermined point, which point may be fixed by the interpositioning of a stoppage means, so that enough momentum will be imparted to the mold to cause it to swing over the vertical from the member 25ᵃ to the member 25ᵃ′. Again, by this construction I am enabled to (1) move the swingable members towards each other and up to a predetermined point, (2) maintain them in that position while the mold swings from the member 25ᵃ to the member 25ᵃ′, and (3) prevent them from falling backwards until the operating connections 46 change their direction of movement and start to operate in the opposite direction.

Of the operating mechanism 46, 46ᵇ indicates a rod pivotally connected at its rear end in any desired manner to the rocker 42ᵇ. The rod 46ᵇ preferably telescopes in and partially extends through a member 46ᶜ, and carries near its inner end a pair of adjustable collars 47, 47ˣ, each of which may be adjustably fixed to the rod by set screws 47′. The member 46ᶜ may comprise a pair of blocks 47ᵃ, 47ᵇ, and a pair of strips 47ᶜ, which connect the blocks together and form guides for the collars 47, 47ˣ, and through them guide the rod 46ᵇ. The block 47ᵇ is formed with an opening through which the rod 46ᵇ slides. The rod 46ᵇ is preferably formed of two elements 46ᵇ′, 46ᵇˣ, (Fig. 8) connected together by screw threads, whereby the rod may be readily lengthened or shortened. The block 47ᵃ is pivotally connected to the crank 46ᵃ in any suitable manner. Preferably, the crank 46ᵃ is provided with an elongated slot 47ᵈ (see Fig. 8), through which the pivot pin 46ᵃ′ of the connection extends, to permit adjustment of the pin toward and from the axis of the shaft 25ᶜ. The pivot pin 46ᵃ′ may comprise a bolt adapted to take a nut whereby it may be secured to the crank. 46ᵈ, 46ᵈ′, indicate compression springs preferably coiled around the rod 46ᵇ, the spring 46ᵈ being interposed between the collar 47 and the block 47ᵃ and the spring 46ᵈ′ being interposed between the block 47ˣ and the block 47ᵇ. The springs 46ᵈ, 46ᵈ′, being coiled around the rod 46ᵇ, are maintained in proper position at all times. As will be understood, the spring 46ᵈ is compressed in the forward stroke of the rod 46ᵇ and when the compression is great enough to overcome the resistance of the members 25ᵃ, 25ᵃ′, the rod 46ᵇ, through the spring, operates the crank arm 46ᵃ and it in turn swings the members 25ᵃ, 25ᵃ′, upwardly or toward each other; likewise in the return stroke of the rod 46ᵇ, the spring 46ᵈ is relieved and the spring 46ᵈ′ is compressed and when the compression is great enough, the rod 46ᵇ, through the spring 46ᵈ′, operates the crank arm in the opposite direction. This construction and arrangement permits relative movement between the rod 46ᵇ and telescopic member 46ᶜ after the crank 46ᵃ has been moved to its rearmost and forwardmost positions. Accordingly, (1) a period of rest is provided for the members 25ᵃ, 25ᵃ′, while in their open position during the time the rod 46ᵇ is moving rearwardly (after the crank 46ᵃ reaches its rearmost position) and then forwardly until it commences to compress the spring 46ᵈ, and (2) after the crank 46ᵃ reaches its forwardmost position, which is preferably determined by a stop 43 to be later described, the spring 46ᵈ operates to maintain the members 25ᵃ, 25ᵃ, substantially together (see Fig. 15) during the time the rod 46ᵃ continues to move forwardly and then rearwardly until it commences to compress the spring 46$^{d'}$. The rest period provided for the members 25$^a$, 25$^{a'}$, as just described, is of sufficient length to permit the mold push-out 23 to deliver the forwardmost mold 14 onto the swingable member 25$^a$, and to permit an empty mold 14 to slide from the members 32$^d$ onto the discharge member 33 and a pallet 14' of bricks to gravitate or roll on the conveyor 51 out of the path of movement of the arms 31$^c$.

The stop 43 is preferably carried by one of the shafts 25$^c$ and is arranged to engage some adjacent part of the machine (see Fig. 8) to stop the members 25$^a$, 25$^{a'}$, in their upward movement in a predetermined position (see Fig. 15), due to the operation of the connections 46 forwardly, as already described. The stop 43 extends laterally from a sleeve 43$^a$ and overlies the adjacent shaft bearing box (see Fig. 7), so as to engage therewith to limit the movement of the shaft in one direction—the direction of movement to close the swingable members 25$^a$, 25$^{a'}$. The sleeve 43$^a$ is preferably adjustably connected to the adjacent shaft 25$^c$ by a clamping bolt 43$^b$. By proper adjustment of the stop 43, the operation of the members 25$^a$, 25$^{a'}$, can be properly controlled. 46$^e$ and 46$^f$ indicate guards carried by the member 46$^c$ arranged to prevent any particles or lumps of clay falling on certain elements of the operating mechanism 46 and affecting their operation.

44 indicates a pair of guides arranged at opposite sides of the support 22 and projecting from the free or forward end thereof. The guide walls are inclined toward each other and serve to engage either end or end wall of a mold 14 and move it transversely of the support, as the mold is moved forward to arrange it centrally of the support and in position to be received, inverted, dumped and discharged by the inverting, separating and discharge mechanism 25. Each of the guides 44 may be supported by a pair of metal strips 44$^a$, 44$^b$ fixed to some stationary part or parts of the machine.

31$^x$ indicates a transverse shaft mounted at its opposite ends in suitable bearings 31$^{ax}$ preferably provided in the blocks 3. 31$^{cx}$ indicates a gear fixed to the shaft 31$^x$ and arranged to mesh with and be driven by a gear 2$^{b'}$. 80 indicates a rock shaft preferably mounted at its opposite ends in suitable supports or bearings 80$^a$ secured to the flanges of the sills 1$^a$, and adapted to pivotally support the rocker 30. The rocker 30 is preferably secured to the shaft 80 by set screws 80$^b$. One face of the rocker 30 is formed with an elongated chamber 30$^a$, the side walls of which operate as guides for a block 30$^b$. 30$^c$ indicates a crank pin secured to the inner face of the gear 31$^{cx}$. The crank pin 30$^c$ extends into a bearing 30$^{b'}$ provided in the block 30$^b$. It will be understood that when the gear 31$^{cx}$ rotates, it operates through the crank pin 30$^c$ to move the block 30$^b$ endwise of the chamber 30$^a$, and by engagement of the block with the walls of the chamber, the gear 31$^{cx}$ serves to rock the rocker 30, whereby the pitman 29 will be operated and the push-out 23 reciprocated.

In the preferred arrangement and correlation of elements, which are disclosed for illustrative purposes, for operating the pitman 29, the rocker 30 is disposed between the bearings 31$^{ax}$ for the shaft 31$^x$; accordingly, I provide the rocker 30 with an elongated, curved slot 30' through which the shaft 31$^x$ extends. This slot permits the rocker to be operated, as above described. Since the block 30$^b$ slides across the slot 30' when the rocker is at its extreme positions of movement forwardly and rearwardly, no interference thereof with the shaft 31 can occur, as will be fully understood from Figs. 29, 30, 31 and 32.

To insure proper correlation between the elements of the mechanisms driven by or from the shaft 2$^s$ and those elements of the mechanisms driven from the shaft 6, I prefer to provide between the shaft 2$^s$ and the gear 2$^f$ an adjustable connection 81, more clearly shown in Figs. 33, 34 and 35. Of these connections 81$^a$ indicates a collar keyed to the shaft 2$^s$. The collar has an arm 81$^b$ formed with a plurality of openings 81$^c$. The web of the gear 2$^f$ is provided with an integral plate 82 in which are formed a plurality of openings 82$^a$, any one of which may be brought into registry with one of the openings 81$^c$. 83 indicates a clamping bolt which extends through one of the openings 81$^c$ and the opening 82$^a$ brought into registry therewith and by means of a nut 83$^a$ secure the gear 2$^f$ to the arm 81$^b$.

Operation: As shown in the drawings, my apparatus is constructed to operate upon a plurality of molds which successively move from one position to another so that they are filled and emptied, then sanded and returned to position for refilling. Starting with a mold 14 on the receiver 21, it is engaged by the push-out 23 and moved to the filling station. Upon the return of the push-out, another mold 14 is positioned on the receiver 21 and it is engaged by the push-out 23 and moved to filling station. The second mold engages the first mold and pushes it forward on the support 22. Through this operation each mold is positioned for bumping by the bumping mechanism 24 and delivered to the inverting, separating and discharge mechanism 25. The operation of the push-out 23 and swingable members 25$^a$, 25$^{a'}$, are correlated, so that the delivery of a filled mold to the member 25$^a$ takes place when said members are in their open position (see Figs. 3 and 12). While in this open position, a pallet 14' is placed on the arms 31ᶜ. Upon the delivery of a mold to the member 25ª, both members 25ª, 25ª′, swing toward each other (see Figs. 13 and 14), the lower edge of the mold engages the feet 31ᶜ′ of the arms 31ᶜ and rocks thereon, as the mold swings past the vertical, onto the member 25ª′ (see Fig. 15) due to the momentum imparted to it by the upward swing of the member 25ª; thereupon, the members 25ª, 25ª′, swing in the opposite direction (Fig. 16) or to the open position (Fig. 17). During this movement (1) the arresters 49 engage the rollers 49ᶠ and arrest the mold engaging members 32ᵈ (Fig. 16), thus causing separation of the mold from the bricks which continue moving or gravitating downwardly with the pallet 14′ and the arms 31ᶜ; and (2) following the separation of the mold from the bricks, the members 32ᶜ engage the stops 38. These stops are so arranged that when the members 32ᶜ engage therewith, the mold engaging members 32ᵈ, which are carried by the members 32ᶜ, will be inclined downwardly and rearwardly. As a result of this disposition of the members 32ᵈ, the empty mold will slide rearwardly and gravitate downwardly (Fig. 17) between the members 25ª, 25ª′, onto the discharge element 33 which has moved into position to receive the empty mold. As the arms 31ᶜ continue moving to their extreme open position, the pallet 14′ engages the conveyor 51 and then gravitates thereon (Fig. 17); at or about the same time, the push-out 23 delivers a filled mold to the member 25ª. The members 25ª, 25ª′, then swing toward each other and the operation just described is repeated. As the members 25ª, 25ª′, swing toward each other, the arms 33ª swing downwardly and rearwardly (Figs. 13 and 14) so that as one filled mold is being inverted, as already set forth, the previously emptied mold is turned right side up and discharged or positioned on the conveyor 53 (Fig. 14).

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. The combination with means for filling molds with material for making bricks, of mold return means, mechanism for inverting each mold and separating the mold and bricks, and means co-operating with said inverting and separating mechanism to turn the empty mold right side up and deliver it to said return means.

2. In apparatus of the class described, the combination of mechanism including a pair or relatively movable, co-operable members, for inverting a filled mold, separating the mold from the bricks, and discharging the empty mold downwardly between said members, and means below said members for receiving the empty mold from the separating elements of said mechanism and turning the mold right side up.

3. In apparatus of the class described, the combination of mechanism including a pair of relatively movable, co-operable members, for inverting a filled mold, separating the mold from the bricks, and discharging the empty mold downwardly beween said members, and means below said members and controlled by one of them for receiving the empty mold from the separating elements of said mechanism and turning the mold right side up.

4. In apparatus of the class described, the combination of mechanism including a pair of relatively movable, co-operable members, for inverting a filled mold, separating the mold from the bricks, and discharging the empty mold downwardly between said members, and means below said members and movable with one of them for receiving the empty mold from the separating elements of said mechanism and turning the mold right side up.

5. In apparatus of the class described, the combination of mechanism, including a pair of swingable members, for inverting a filled brick mold, separating the mold from the bricks and discharging the empty mold downwardly between said members, a chute, the receiving end of which is arranged below said swingable members, and means arranged to receive the empty mold when discharged downwardly between said members and turn the mold right side up and deliver it in righted position on to said chute.

6. In apparatus of the class described, the combination of mechanism including a pair of relatively movable, cooperable members, for inverting a filled mold, separating the mold from the bricks, and discharging the empty mold downwardly between said members, means below said members for receiving the empty mold from the separating elements of said mechanism and turning the mold right side up, and guiding means interposed between said separating elements and said receiving means.

7. In apparatus of the class described, the combination of a swingable receiving member, a separate swingable member having a pair of elements disposed upon opposite sides of the axis of said separate member, one of said elements being co-operable with the first mentioned swingable member to invert a filled mold, means for operating said swingable members, and means for separating the mold from the bricks and for discharging the empty mold on to the other element of said separate swingable member.

8. In apparatus of the class described, the combination of a swingable receiving member, a separate swingable member spaced therefrom to form a gap between said members, said separate member comprising a pair of elements disposed upon opposite sides of its axis, one of said elements being co-operable with the first mentioned swingable member to invert a filled brick mold and the other element being arranged to be positioned below the gap between said members when they are moved to the open position, means for operating said swingable members, and means for separating the mold from the bricks and for discharging the empty mold downwardly through the gap on to the last mentioned element.

9. In apparatus of the class described, the combination of a swingable mold receiving member, a swingable discharge member, said discharge member comprising pairs of relatively movable devices and a mold engaging element carried by one device of each pair, means for operating said swingable members toward and from each other, and means for arresting said mold engaging elements and thereafter arresting the relatively movable devices of said pairs of devices as said members swing from each other.

10. In apparatus of the class described, the combination of means for filling molds with material, means including a pair of members swingable toward and from each other for inverting each mold and separating it from the bricks, means carried by one of said members for turning the empty mold right side up, and means for moving the molds successively to said filling means and then to said inverting and separating members.

11. In apparatus of the class described, mechanism including a pair of co-operating pivotal members movable relatively to each other, for inverting a mold and separating the mold from the bricks and righting the empty mold.

12. In apparatus of the class described, the combination of a pair of mold receiving and pallet receiving members swingable toward and from each other, an element arranged to engage the mold when delivered to the pallet receiving member, means for arresting said mold engaging element during movement of the pallet receiving member away from the receiving member, and means for causing the discharge of the empty mold from said element after separation of the mold from the bricks.

13. In apparatus of the class described, the combination of mechanism, including a pair of swingable members, movable toward and from each other, said members being spaced from each other to form a gap between them, means for operating said members to invert a filled mold as they swing in one direction, means for separating the mold from the bricks as the mold is inverted, and means for controlling the elements of said separating means to cause discharge of the mold rearwardly and downwardly through said gap.

14. In apparatus of the class described, the combination of a member for receiving a filled mold, a separate member cooperable with said receiving member and comprising an element arranged to receive a pallet and relatively movable devices one of which is arranged to engage the mold during operation of said members, means for operating said members, means for controlling the movement of said mold engaging device to cause separation of the mold from the bricks, and separate means for controlling the movement of the other of said devices to cause discharge of the empty mold from the mold engaging device, said separate controlling means being arranged to arrest the last mentioned device before the said separate member reaches a horizontal position in its opening movement, whereby the empty mold is discharged rearwardly.

15. In apparatus of the class described, a pair of members swingable toward and from each other and arranged to receive and invert a filled brick mold, one of said members having elements which engage and separate the mold from the bricks and then discharge and turn the mold right side up, and means for operating said members and controlling certain of said elements.

16. In apparatus of the class described, the combination of a pair of movable members spaced from each other to form a gap between them, means for operating said members to receive a filled brick mold and invert it, one of said members having elements which engage the mold and separate it from the bricks, and means for controlling said mold engaging elements to cause the discharge of the empty mold therefrom downwardly through the gap between said members.

17. In apparatus of the class described, the combination of a swingable member arranged to receive a filled mold, a separate swingable member arranged in co-operation with the receiving member to receive the mold therefrom and invert it, a pair of elements connected to said separate member but mounted to move relative thereto, means for operating said members, and means successively engaging said elements during the opening movement of said members, whereby the mold is first separated from the bricks and thereafter discharged.

18. In apparatus of the class described, the combination of a swingable member arranged to receive a filled mold, a second swingable member on which the bricks are dumped when said members are operated to a substantially closed position and then to an open position, relatively movable devices movable with said second member, means for arresting one of said devices to cause separation of the mold from the bricks during opening movement of said members, means for arresting the other device to cause discharge of the empty mold from said separation means, and means for operating said members.

19. In apparatus of the class described, the combination of a swingable member arranged to receive a filled mold, a second swingable member on which the bricks are dumped when said members are operated to a substantially closed position and then to an open position, said second swingable member including relatively movable devices, means engaging one of said devices to cause separation of the mold from the bricks during opening movement of said members, means engaging another of said devices to arrest said separation devices in a rearwardly and downwardly inclined position to cause discharge of the empty mold therefrom rearwardly, and means for operating said members.

20. In apparatus of the class described, the combination of a swingable member arranged to receive a filled mold, a second swingable member on which the bricks are dumped when said members are operated to a substantially closed position and then to an open position, relatively movable devices movable with said second member, means for arresting one of said devices to cause separation of the mold from the bricks during opening movement of said members, means for arresting the other device to cause discharge of the empty mold from said separation means, an element arranged below said members when they are opened for receiving the empty mold when discharged from said separation means, and means for operating said members.

21. In apparatus of the class described, the combination of a swingable member arranged to receive a filled mold, a second swingable member on which the bricks are dumped when said members are operated to a substantially closed position and then to an open position, relatively movable devices movable with said second member, means for arresting the movement of one of said devices to cause separation of the mold from the bricks during opening movement of said members, means for arresting the other device to cause discharge of the empty mold from said first mentioned device, an element arranged below said members when they are opened for receiving the empty mold when discharged from said first mentioned device, said element being movable downwardly and rearwardly to turn the empty mold right side up, and means for operating said members.

22. In apparatus of the class described, the combination of a swingable member arranged to receive a filled mold, a second swingable member on which the bricks are dumped when said members are operated to a substantially closed position and then to an open position, relatively movable devices movable with said second member, means for arresting the movement of one of said devices to cause separation of the mold from the bricks during opening movement of said members, means for arresting the other device to cause discharge of the empty mold from said first mentioned device, an element arranged below said members when they are opened for receiving the empty mold when discharged from said first mentioned device, said element being connected to said second swingable member and movable therewith to turn the mold right side up, and means for operating said members.

23. In apparatus of the class described, the combination of the swingable mold receiving member, a swingable dicharge member, means for swinging said members toward and from each other, whereby a mold is inverted, means, including elements swingable with said discharge member, for separating the mold from the bricks and causing the discharge of the empty mold rearwardly as said members swing from each other.

24. In apparatus of the class described, the combination of a swingable mold receiving member, a swingable discharge member, means for swinging said members toward and from each other whereby a mold is inverted, means, including elements swingable with said discharge member, for separating the mold from the bricks and causing the discharge of the empty mold rearwardly as said members swing from each other, and an element connected to said discharge member and moved thereby into position to receive the empty mold discharged from said separating means.

25. In apparatus of the class described, the combination of a swingable mold receiving member, a swingable member, means for swinging said members toward and from each other, whereby a mold is inverted, means, including elements swingable with said discharge member, for separating the mold from the bricks and causing the discharge of the empty mold rearwardly as said members swing from each other, and an element connected to and movable with said discharge element, whereby it is moved into position to receive the empty mold when said members move away from each other and operates to turn the empty mold right side up as said members swing toward each other.

26. In apparatus of the class described, the combination of a swingable mold receiving member, a second swingable member carrying supporting elements disposed substantially on opposite sides of the axis about which said member swings, means for swinging said members, whereby the mold is swung over onto one of the elements of said second member and inverted and the other element of said member positioned to receive the empty mold, and means for separating the mold from the bricks and discharging it from the first mentioned element onto the last mentioned element.

27. In apparatus of the class described, the combination of a swingable mold receiving member, a second swingable member carrying supporting and delivery elements disposed substantially on opposite sides of the axis about which said member swings, and means for swinging said members whereby the mold is swung over onto the supporting element of said second member and inverted and the delivery element of said member positioned to receive the empty mold, and means for operating said supporting element to separate the mold from the bricks and discharge it onto said delivery element.

28. In apparatus of the class described, the combination of a swingable mold receiving member, a second swingable member having devices disposed substantially on opposite sides of the axis about which said member swings for separating the mold from the bricks and turning the empty mold right side up, means for operating said separating devices for discharging the empty mold therefrom to the devices for turning the mold right side up, and means for operating said members toward and from each other.

29. In apparatus of the class described, the combination of a pair of swingable members, means for operating said members toward each other, said means comprising relatively movable elements and a compression spring between, and means for stopping said members at a predetermined position, said compression spring operating to maintain the members in position until said operating means moves in the opposite direction.

30. In apparatus of the class described, the combination of a swingable mold receiving member and a swingable discharge member, said discharge member comprising pairs of relatively movable devices and a mold engaging element carried by one device of each pair, means for yieldingly connecting said devices of each pair together, means for operating said swingable members toward and from each other, and means for arresting said mold engaging elements and thereafter arresting the relatively movable devices of said pairs of devices as said members swing from each other.

31. In apparatus of the class described, the combination of a swingable mold receiving member and a swingable discharge member, said discharge member comprising pairs of relatively movable devices and a mold engaging element carried by one device of each pair, means for yieldingly connecting said devices of each pair together, means for operating said swingable members toward and from each other, and means for arresting said mold engaging elements and thereafter arresting the relatively movable devices of said pairs of devices as said members swing from each other, the arresting means for said relatively movable devices being adjustable.

32. In apparatus of the class described, the combination of mechanism including a pair of relatively movable members cooperable to invert a mold and separate the mold from the bricks, means movable with one of said members for turning the empty mold right side up, and guides for the mold interposed between the elements which separate the mold from the bricks and said mold righting means.

33. In apparatus of the class described, the combination of a pair of swingable members movable toward and from each other to invert a filled mold, said members being provided with elements which separate the mold from the bricks during the inverting of the mold and then turn the mold right side up, means for operating said separating elements, and means for operating said members.

34. In apparatus of the class described, the combination of a pair of swingable members movable toward and from each other to invert a filled mold, said members being provided with elements which engage the mold and separate it from the bricks and then turn the mold right side up, means for operating said separating elements, separate means for controlling said separating elements to cause the empty mold to slide from said separating elements to the righting elements, and means for operating said members.

35. In apparatus of the class described, the combination of a pair of swingable members movable toward and from each other to invert a mold, one of said members being provided with elements which separate the mold from the bricks and then turn the empty mold right side up, devices arranged in the path of movement of said separating elements to engage and operate the same as said members swing from each other.

36. In apparatus of the class described, the combination of a pair of swingable members movable toward and from each other to invert a mold, one of said members being provided with elements which separate the mold from the bricks and then turn the empty mold right side up, and devices arranged in the path of movement of said separating elements to engage and operate the same as said members swing from each other to first separate the mold from the bricks and then discharge the mold from the separating elements to the righting elements.

37. In apparatus of the class described, the combination of means for filling a mold with material, means arranged below said filling means for moving the empty mold to a position for feeding to said filling means, mechanism for separating the mold from the bricks and for discharging the empty mold rearwardly and downwardly onto said mold moving mechanism, and means for feeding the mold to said filling means and then to said separating and discharging mechanism.

38. In apparatus of the class described, the combination of means for filling a mold with material, means arranged below said filling means for moving the empty mold to a position for feeding to said filling means, mechanism, including a pair of inverting members, for separating the mold from the bricks and for discharging the empty mold rearwardly and downwardly onto said mold moving mechanism, and means for feeding the mold to said filling means and then to said separating and discharging mechanism.

39. In apparatus of the class described, the combination of means for filling a mold with material, means arranged below said filling means for moving the empty mold to a position for feeding to said filling means, mechanism, including a pair of inverting members, for separating the mold from the bricks and for discharging the empty mold rearwardly and downwardly between said inverting members onto said mold moving mechanism, and means for feeding the mold to said filling means and then to said separating and discharging mechanism.

40. In apparatus of the class described, the combination of a pair of swingable members for receiving and inverting a filled brick mold, means for separating the mold from the bricks, and means for operating said members, said operating means comprising a crank connected to one of said members, a driving crank, a pitman and cushioning means between said pitman and the opposite sides of one of said cranks, whereby relative movement between said pitman and the said crank is permitted to provide periods of rest for said swingable members at the ends of their movements.

In testimony whereof I affix my signature.

HENRY W. B. GRAHAM.